United States Patent [19]

Wegner et al.

[11] Patent Number: 5,120,610
[45] Date of Patent: Jun. 9, 1992

[54] POLYMERS HAVING PHTHALOCYANINE UNITS AND THEIR USE AS OPTICALLY TRANSPARENT FILMS

[75] Inventors: Gerhard Wegner, Mainz-Drais, Fed. Rep. of Germany; Walter Caseri, Zurich, Switzerland; Thomas Sauer, Mainz-Kostheim, Fed. Rep. of Germany

[73] Assignee: BASF Aktiengesellschaft, Ludwigshafen, Fed. Rep. of Germany

[21] Appl. No.: 489,897

[22] Filed: Mar. 7, 1990

[30] Foreign Application Priority Data

Mar. 16, 1989 [DE] Fed. Rep. of Germany ....... 3908458

[51] Int. Cl.[5] .............................................. B32B 9/06
[52] U.S. Cl. .................................... 428/447; 528/15; 528/25; 528/29; 528/32; 528/34; 528/395; 528/423; 428/332; 428/333; 525/478
[58] Field of Search ....................... 528/15, 25, 29, 32, 528/34, 395, 423; 525/478; 428/332, 333, 447

[56] References Cited

U.S. PATENT DOCUMENTS 4,828,917  5/1989  Wegner et al. .................. 427/372.2
4,886,685 12/1989  Wegner et al. ..................... 427/435

FOREIGN PATENT DOCUMENTS 3242712 12/1988  Fed. Rep. of Germany .

OTHER PUBLICATIONS

Cofacial Assembly of Partially Oxidized Metallomacrocycles . . . , J. Am. Chem. Soc. 1983, 105, 1539–1550, Dirk et al., Inorganic Chemistry, vol. 2, pp. 1064–1065 (1963).
Mol. Cryst. Liq. Cryst, 1988, vol. 162B, pp. 97–118, Control of the Discotic to Isotropic Transition in Alkoxy-Substituted . . . Sauer et al.
Angew. Chem., vol. 98, pp. 1114–1115 (1986) No. 12.

Primary Examiner—Melvyn I. Marquis
Attorney, Agent, or Firm—Keil & Weinkauf

[57] ABSTRACT

Novel polymers contain phthalocyanine ring systems bonded via axial bonds to a central metal atom in the polymer chain and consist of repeating units of the general formula (I)

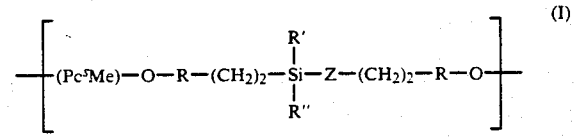

In the general formula (I), $Pc^s$ is a phthalocyanine ring system having peripheral substituents, Me is the central atom of the phthalocyanine ring system, which atom is bonded in the polymer main chain, suitable central metal atoms Me being silicon and germanium, R is alkylene, R' and R" are each alkyl, cycloalkyl, aryl or alkoxy and Z is a silicon-carbon bond or further Si-containing groups. The novel polymers can be particularly advantageously used for the production of ultrathin layers by the LB technique, optically transparent films having high optical anisotropy and a high volume concentration of phthalocyanine radicals being formed.

5 Claims, No Drawings

POLYMERS HAVING PHTHALOCYANINE UNITS AND THEIR USE AS OPTICALLY TRANSPARENT FILMS

The present invention relates to novel polymers having phthalocyanine units in the main chain, the phthalocyanine units being bonded via axial bonds to a central metal atom in the polymer main chain. The present invention furthermore relates to the use of the novel polymers, in particular for the production of ultrathin layers and optically transparent films having an extremely high volume concentration of phthalocyanine radicals.

Polymers which contain divalent radicals of metallophthalocyanines as chain members, for example phthalocyaninatopolysiloxanes or phthalocyaninatopolygermyloxanes, are known (cf. inter alia Org. Chem. 2 (1963), 1064-1065, J. Amer. Chem. Soc. 105 (1983), 1539-1550 and DE-A-32 42 712). EP-A-246 500 and Angew. Chem. 98 (1986), 1114-1115 describe the use of soluble and/or fusible metallomacrocyclic polymers, for example phthalocyaninatopolysiloxanes or polygermyloxanes substituted peripherally by hydrophobic groups, for the production of solid, thin, ordered layers having a controlled molecular structure. The peripherally substituted phthalocyaninatopolysiloxanes or -polygermyloxanes can be used to produce monomolecular layer structures (monolayers) or multimolecular layer structures (multilayers), which have a uniform molecular orientation over the entire layer without formation of domains and therefore have a number of particular and advantageous properties, for example optical anistropy.

It is an object of the present invention to provide further, novel polymers which have phthalocyanine units in the polymer main chain, possess particular and advantageous properties, have a wide range of uses and in particular are suitable for the production of ultrathin layers having advantageous properties.

We have found that this object is achieved, surprisingly, by the novel phthalocyaninato polymers of the type described in detail below.

The present invention accordingly relates to polymers which consist of repeating units of the general formula (I)

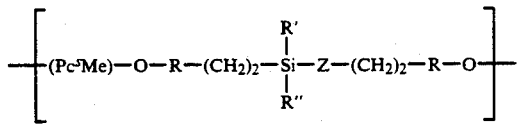

where
- $Pc^s$ is a phthalocyanine radical which is doubly deprotonated at the nitrogen atoms pointing toward the center and has peripheral substituents,
- Me is Si or Ge, as the central atom of the phthalocyanine radical $Pc^s$, which atom is bonded in the polymer main chain,
- R is a linear or branched alkylene group of 1 to 18 carbon atoms,
- R' and R'' are identical or different radicals and independently of one another are each alkyl, in particular of 1 to 12 carbon atoms, cycloalkyl, in particular of 5 or 6 carbon atoms, unsubstituted or alkyl-substituted phenyl, or alkoxy, in particular of 1 to 12 carbon atoms, and
- Z is either a silicon-carbon bond or one of the groups

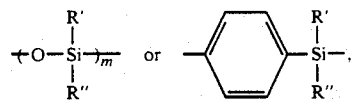

where m is an integer equal to or greater than 1, in particular from 1 to 10, and R' and R'' have the above-mentioned meanings.

The present invention furthermore relates to ultrathin layers and optically transparent films produced from the novel polymers according to the invention, and their use.

The novel polymers consist of the repeating units of the general formula (I), i.e. their polymer chain is composed of the repeating units of the general formula (I), apart from terminal groups, and, in the novel polymers, the repeating units of the general formula (I) may be identical or different. The mean degree of polymerization n of the novel polymers, i.e. the number of repeating units of the general formula (I) of which the novel polymers are composed, may vary within wide limits. To obtain advantageous performance characteristics, it has proven advantageous if the mean degree of polymerization n of the novel polymers is in general not less than 5, preferably from 5 to 100. Novel polymers whose mean degree of polymerization n is 5-20 have proven particularly advantageous with regard to their ease of preparation and their performance characteristics. The novel polymers are generally soluble in an organic, water-immiscible solvent and/or fusible, which is important and significant particularly with regard to their use for the production of ultrathin layers or optically transparent films. The novel polymers are preferably soluble in these organic, water-immiscible solvents which are readily vaporizable at room temperature, for example chloroform and the like.

The group ($Pc^s$Me) in the repeating units of the general formula (I) is a metallophthalocyanine group in which the metal atom Me is silicon or germanium, is the central metal atom of the phthalocyanine ring system and is bonded in the polymer chain of the novel polymers in the form of —O—Me—O— groups. Suitable central metal atoms Me for the novel polymers are silicon and/or germanium, silicon being preferred. The phthalocyanine ring system $Pc^s$ arranged around the central metal atom Me and bonded via axial bonds to the central metal atom Me is a phthalocyanine radical which is doubly deprotonated at the nitrogen atoms pointing toward the center and carries peripheral substituents. Peripheral or outer substituents are substituents which are arranged at the periphery, i.e. the benzene rings, of the phthalocyanine ring system. The peripheral substituents serve in particular for achieving the desired solubility and/or fusibility of the novel polymers. Suitable peripheral substituents are any organic, in particular hydrophobic, radicals, i.e. radicals without hydrophilic terminal groups. Thus, the peripheral substituents of the phthalocyanine ring system $Pc^s$ may be, for example, aliphatic radicals, for example long-chain alkyl or long-chain alkoxy radicals, aromatic radicals, for example aryl groups, or mixed aliphatic-aromatic radicals, and the peripheral substituents may also contain heteroatoms, for example ether bonds, or groups containing heteroatoms, for example carbonyl groups or sulfonamido groups, provided that the hydrophobic action of these peripheral substituents is not adversely affected as a result. The organic radicals for the peripheral substituents may be either linear or branched. As a rule, the novel polymers are hydrophobic and insoluble in water.

The group (Pc$^s$Me) in the repeating units of the general formula (I) may be represented and illustrated by the general formula (II) below.

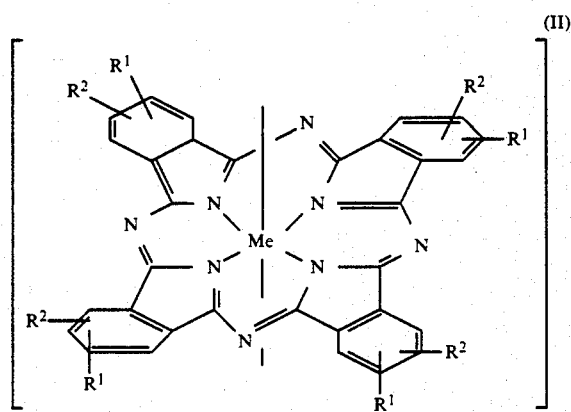
(II)

In the general formula (II), Me is the central metal atom and is silicon or germanium, in particular silicon. The peripheral substituents $R^1$ and $R^2$ on the pthalocyanine ring system may be identical or different. $R^1$ and $R^2$ are preferably peripheral substituents which have nonpolar, hydrophobic terminal groups. Suitable substituents $R^1$ and $R^2$ are the abovementioned orgainc radicals, which may contain heteroatoms or groups containing heteroatoms, and one of the radicals $R^1$ or $R^2$ may furthermore be hydrogen. Preferably, however, both radicals $R^1$ and $R^2$ in the general formula (II) are an organic radical. Examples of the peripheral substituents $R^1$ and $R^2$ are alkyl, alkoxy, alkoxyalkyl, aryl, alkaryl and aralkyl, or $R^1$ and $R^2$ together may furthermore be the radical of a fused aromatic ring system. Preferred peripheral substituents are long-chain alkyl groups, in particular those of 6 to 30 carbon atoms, and long-chain alkoxy groups, in particular those of 6 to 30 carbon atoms. It has proven particularly advantageous if each phenyl ring of the phthalocyanine ring system carries one or more long-chain alkyl radicals or one or more long-chain alkoxy radicals. However, the two peripheral substituents $R^1$ and $R^2$ are preferably a long-chain alkyl group and/or a long-chain alkoxy group, in which case $R^1$ and $R^2$ are as a rule, but not necessarily, identical.

An example of a preferred group (Pc$^s$Me) in the repeating units of the general formula (I) is the phthalocyanine ring system of the general formula (III)

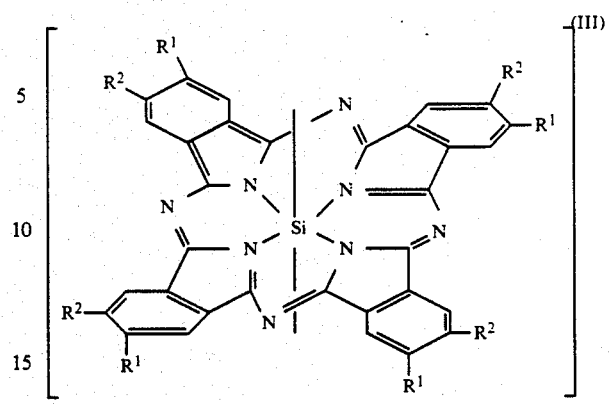
(III)

having an Si central atom. In the general formula (III), the peripheral substituents $R^1$ and $R^2$ have the abovementioned meanings. Typical examples of the radicals $R^1$ and $R^2$ are —OC$_8$H$_{17}$ and —OC$_{12}$H$_{25}$.

In the repeating units of the general formula (I), R is, in particular, a linear alkylene group, preferably of 2 to 10 carbon atoms, e.g. —C$_2$H$_4$—. Examples of the radicals R' and R" in the general formula (I) are methyl, ethyl and phenyl. Novel polymers which consist of repeating units of the general formula (I) where Z is a group —(O—SiR'R")$_m$— have particularly advantageous properties. Examples of R' and R" in this group are once again methyl, ethyl and phenyl. m is an integer equal to or greater than 1, for example for the mean degree of polymerization of a siloxane prepolymer, and is in particular from 2 to 10.

Novel polymers may also be described structurally in terms of their method of preparation. In particular, peripherally substituted phthalocyaninatodichlorosilanes [SiCl$_2$Pc$^s$] can be used as starting compounds. The preparation of such phthalocyaninatodichlorosilanes is known and is described in the literature. They can be obtained, for example, by converting 5,6-substituted 1,3-diiminoisoindolenine, for example 5,6-dialkyl- or 5,6-dialkoxy-1,3-diiminoisoindolenine, in the presence of silicon tetrachloride by the method described in Mol. Cryst. Liq. Cryst. 162B (1988), 97–118. The phthalocyaninatodichlorosilanes [SiCl$_2$Pc$^s$] are then reacted with an α-olefinically unsaturated primary alcohol to give α, ω-olefin-terminated phthalocyaninatosiloxanes of the general formula (IV)

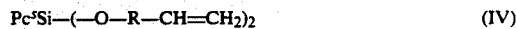

Pc$^s$Si—(—O—R—CH=CH$_2$)$_2$ (IV)

These α,ω-olefin-terminated phthalocyaninatosiloxanes of the general formula (IV), where R has the meanings stated further above, are one of the building blocks of the novel polymers; for the preparation of the novel polymers, they are reacted with a bifunctional silane with catalysis by suitable catalysts, for example in the presence of divalent platinum, in a conventional manner. If the disilane used is, for example, a compound of the type HSi(R'R")H, the product is a novel polymer having repeating units of the general formula (I), where Z is then a silicon-carbon bond. If functional silanes of the type H—Si(R'R") [—O—Si(R'R")]$_m$—H (where R', R" and m have the abovementioned meanings) are used for the reaction with the α,ω-olefin-terminated phthalocyaninatosiloxanes of the general formula (IV), the novel polymers obtained are those in which, in the repeating units of the general formula (I), Z is an —(O—SiR'R")$_m$ group.

The preparation of the novel polymers, which is illustrated and described above for the phthalocyaninatosiloxanes, also applies to the novel polymers in which, in the repeating units of the general formula (I), the central metal atom Me is germanium.

The reaction of the phthalocyaninatodichlorosilanes with the α-olefinically unsaturated primary alcohols usually takes place at elevated temperatures, in particular about 80°–130° C. For the reaction of the α,ω-olefin-terminated phthalocyaninatosiloxanes with the bifunctional silanes, the reaction temperatures are usually from 30° to 70° C.

Because of their excellent properties, the novel polymers according to the invention are suitable for many applications, for example as pigments having high light-fastness in lamps and coating layers for articles of all types. It has proven very advantageous to use the novel polymers for producing optically transparent films having high absorption in the range of visible light; such films can be used, for example, as light filters. Because of their composition, the novel polymers have water-repellant properties and for this reason, and because of their dimensional stability, are very suitable for the production of optical components which, regardless of the atmospheric humidity, are superior to conventional sheets and films doped with low molecular weight colorants. Furthermore, the color-imparting element, i.e. the phthalocyanine ring system, is firmly anchored in the polymer and therefore cannot migrate out.

The novel polymers are particularly suitable for the production of very thin layers, for example those having a thickness of from 0.002 to 5 μm. Ultrathin layers having a monomolecular layer structure (monolayers) or multimolecular layer structure (multilayers) can be produced from the novel polymers in a simple manner by the conventional Langmuir-Blodgett technique (also referred to below as the LB technique or LB process). For this purpose, the novel polymers are dissolved in an organic, water-immiscible solvent, e.g. chloroform, and this solution is spread over the water surface of a Langmuir film balance and a monomolecular layer of the novel polymers is formed on the water surface with evaporation of the solvent. This surface film at the air-/water interface is then compressed by means of the mobile barrier of the film balance to such an extent that a defined, solid-like layer is formed from only one layer of molecules. This monomolecular layer of the novel polymers is then transferred to a substrate by immersion and withdrawal of the said substrate under constant surface pressure, immersion and withdrawal being repeated if necessary. This process is usually carried out at about 0°–50° C. The number of immersion operations determines the number of layers deposited on the substrate. By repeating immersion and withdrawal several times, it is possible to form a film having a multimolecular layer structure on the substrate. To produce the novel ultrathin layers, the substrate is preferably immersed and withdrawn at right angles to the water surface to transfer the molecular film produced on the water surface to the substrate.

The ultrathin, solid layers produced from the novel polymers by the LB technique possess a defined, uniform, regular structure having a homogeneous, controllable molecular composition without domain formation in the individual strata or layers. These ultrathin layers or films produced from the novel polymers by the LB technique are optically transparent and have optical anisotropy in conjunction with an extremely high volume concentration of phthalocyanine radicals. These ultrathin layers or films can therefore be particularly advantageously used, for example, as optical waveguides, polarizers, nonlinear optical components, for example for tripling the frequency of IR laser light, and the like. It is also a particular advantage that the optical absorption of the novel polymers is independent of the volume concentration. Because of the formation of aggregates, phthalocyanines and similar colorants usually give spectra which change as a function of concentration. This aggregation is suppressed in the case of the novel polymers, in spite of a high colorant concentration. The novel polymers or the ultrathin layers or films produced therefrom therefore give spectra which have shifted toward red, relative to the conventional phthalocyanines.

Suitable substrates for the production of the ultrathin layers from the novel polymers by the LB technique are the known, solid, preferably dimensionally stable substrates conventionally used for this purpose, as described for this purpose in, for example, EP-A-246 500 cited at the outset. The substrates may be transparent or opaque, electrically conductive or insulating. What is important is that the surface of the substrates on which the monomolecular layers of the novel polymers are applied is hydrophobic. Examples of suitable materials for substrates are metal, plastics, glass, ceramic materials or cellulose products, such as papers. As a rule, transparent and optically transparent substrates, for example of glass or plastics, e.g. polyester, are used for optical elements.

The Examples which follow illustrate the invention. In the Examples below, Pc$^s$ is an octa-substituted phthalocyanine ring system of the general formula (III), where R' and R" are identical and are each a long-chain alkoxy radical.

EXAMPLE 1

For the preparation of a polymer consisting of repeating units of the general formula (I), where R is —C$_2$H$_4$—, Z is a —(O—Si(CH$_3$)$_2$)$_m$—group and m is 3, the following procedure was employed:

300 mg (241 μmol) of [SiCl$_2$Pc$^s$], 255.6 mg (721 μmol) of TlCF$_3$SO$_3$ and 100 mg of 1,12-diaminododecane in 2.5 ml of 3-buten-1-ol were refluxed for 2 hours under nitrogen. The precipitate which separated out on cooling was filtered off and dissolved in 5 ml of chloroform, the solution was filtered and 25 ml of methanol were added to the filtrate. 293 mg (95%) of the compound [Pc$^s$Si-(OC$_2$H$_4$CH=CH$_2$)$_2$] were then obtained in the form of a green precipitate, which was filtered off and dried. The product thus obtained had the following NMR characteristics:

$^1$H-NMR: Olefin-H: m 3.71 ppm, 1H,
m 3.28 ppm, 2H.
Alkyl-H: m −1.04 ppm, 2H,
t −2.06 ppm, 2H $^3$J(H,H)=6.7 Hz.
$^{13}$C-NMR: Alkyl-C: 54.79 ppm, 34.27 ppm.

About 0.5 mg of trans-dichloro(aniline) (styrene)-platinum(II) was added to 107.6 mg (82 μol) of this product in 1 ml of toluene under nitrogen at 60° C., and the mixture was stirred for 15 minutes. Thereafter, 0.5 ml of a solution of 46.2 mg (163 μol) of the bifunctional silane H[SiO(CH$_3$)$_2$]$_3$Si(CH$_3$)$_2$H in 1 ml of toluene was added and the mixture was left for 21 hours at 60° C. After 10 ml of methanol had been added and the resulting precipitate had been filtered off and dried, 93.7 ml (72%) of the desired polymer having a mean degree of polymerization of 9.3 were obtained.

This polymer was dissolved in chloroform and the solution was spread over the water surface of a Langmuir film balance. The shear/area graph recorded in the usual way showed the following characteristics:

Beginning of pressure increase: 135 Å$^2$/monomer unit

Beginning of plateau: 105 Å/monomer unit

The pressure at the beginning of the plateau was 32 mN/m. The monomolecular film of the polymer spread over the water surface was transferred to the hydrophobic surface of a transparent glass substrate by immersing the substrate into the water surface, and withdrawing it, at right angles. The immersion operation was repeated until a film having a thickness of 0.1 μm had formed on the glass substrate. The UV absorption edge was at 678 nm ($\lambda_{max}$). The absorption of linearly polarized light incident at right angles to the plane of the substrate depended on the angle between the plane of polarization and the direction of immersion, this being uniform over the total area of the film. The intensity ratio on rotation of the plane of polarization through 90° C. was from 1.4 to 1.5 (694 nm). This demonstrates that the novel polymer is oriented in a preferred direction on the substrate, i.e. at right angles to the drawing direction.

EXAMPLES 2 AND 3

Polymers similar to those in Example 1 were prepared, except that in this case Z in the general formula (I) was an Si-C bond on the one hand (Example 2) and a —Ph—Si(CH$_3$)$_2$— group on the other hand (Example 3).

The procedure described in Example 1 was followed, with appropriate modification of the experimental method, i.e. H$_2$SiPh$_2$ was used as the bifunctional silane compound in Example 2 and HSi—Ph—SiH was used as the said compound in Example 3. The polymer of Example 2 was obtained in a yield of 86% and had a mean degree of polymerization of 84.8. The mean degree of polymerization of the polymer obtained in Example 3 in a yield of 81% was 15.7. The polymers were characterized by the particular UV, IR and NMR spectra, which did not differ significantly from those of the polymer of Example 1. The polymers prepared according to Examples 2 and 3 were spread over the water surface of a Langmuir film balance, as described in Example 1, and the relevant shear/area graph was recorded. The following measured values were obtained:

| for Example 2: | |
|---|---|
| Beginning of pressure increase = | 162 Å$^2$/monomer unit |
| Beginning of plateau = | 117 Å$^2$/monomer unit |
| Pressure at beginning of plateau = | 32 mN/m |
| for Example 3: | |
| Beginning of pressure increase = | 195 Å$^2$/monomer unit |
| Beginning of plateau = | 136 Å$^2$/monomer unit |
| Pressure at beginning of plateau = | 33 mN/m. |

We claim:

1. A polymer consisting of repeating units of the formula (I)

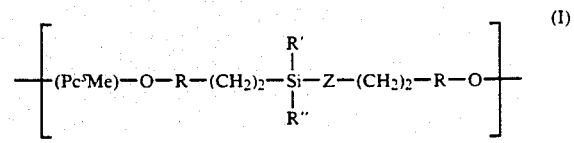

where

Pc$^s$ is a phthalocyanine radical of the formula II

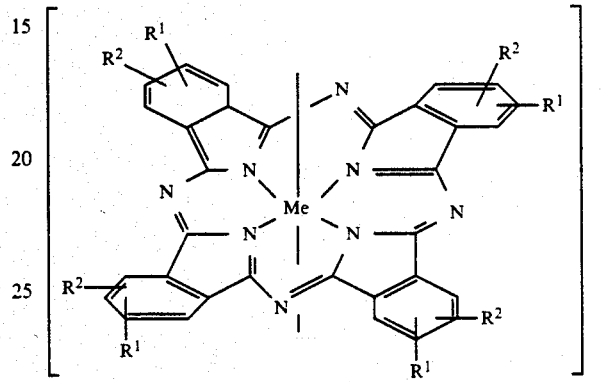

which is doubly deprontonated at the nitrogen atoms pointing toward the center and has peripheral substituents R$^1$ and R$^2$ which can be the same or different and have non-polar, hydrophobic terminal groups, Me is Si or Ge, as the central metal atom of the phthalocyanine ring system Pc$^s$, which atom is bonded in the polymer main chain, R is a linear or branched alkylene group of 1 to 18 carbon atoms, R' and R" are identical or different radicals and independently of one another are each alkyl, cycloalkyl, unsubstituted or alkyl-substituted phenyl, or alkoxy, and Z is either a silicon-carbon bond or one of the groups

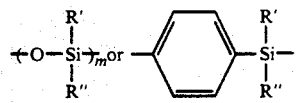

where m is an integer equal to or greater than 1, and R' and R" have the abovementioned meanings.

2. An ultrathin layer, produced from a polymer as defined in claim 1 by the Langmuir-Blodgett technique.

3. An optically transparent film, produced from a polymer as defined in claim 1.

4. A layer element, containing ultrathin layers as defined in claim 2 on a substrate having a hydrophobic surface.

5. A layer element containing optically transparent films as defined in claim 3 on a substrate having a hydrophobic surface.

* * * * *

UNITED STATES PATENT AND TRADEMARK OFFICE
CERTIFICATE OF CORRECTION

PATENT NO. : 5,120,610

DATED : June 9, 1992

INVENTOR(S) : Gerhard WEGNER, Walter CASERI, Thomas SAUER

It is certified that error appears in the above-identified patent and that said Letters Patent is hereby corrected as shown below:

Claim 1, col. 8, formula II delete and insert as shown below

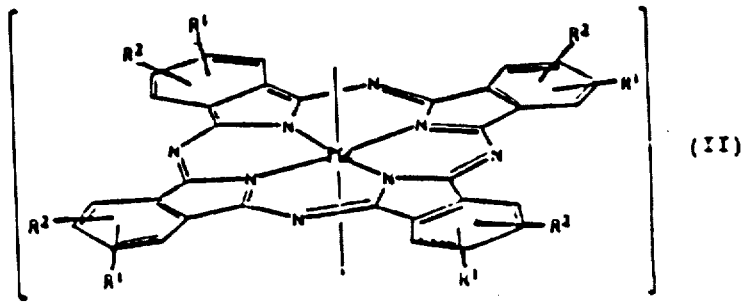

Claim 1, col. 8, line 30, delete "deprontonated" and insert therefor --deprotonated--.

Signed and Sealed this

Tenth Day of August, 1993

Attest:

MICHAEL K. KIRK

*Attesting Officer*     *Acting Commissioner of Patents and Trademarks*